United States Patent
Yang et al.

(10) Patent No.: US 10,962,119 B2
(45) Date of Patent: Mar. 30, 2021

(54) ARC-SHAPED STEPPED MAGNETIC FLUID SEALING DEVICE

(71) Applicant: GUANGXI UNIVERSITY OF SCIENCE AND TECHNOLOGY, Liuzhou (CN)

(72) Inventors: Xiaolong Yang, Liuzhou (CN); Decai Li, Liuzhou (CN); Fan Chen, Liuzhou (CN); Meili He, Liuzhou (CN); Peng Sun, Liuzhou (CN); Fuxiang Hao, Liuzhou (CN)

(*) Notice: Subject to any disclaimer, the term of this patent is extended or adjusted under 35 U.S.C. 154(b) by 0 days.

(21) Appl. No.: 16/900,836

(22) Filed: Jun. 12, 2020

(65) Prior Publication Data

US 2020/0309270 A1    Oct. 1, 2020

Related U.S. Application Data

(63) Continuation of application No. PCT/CN2018/091903, filed on Jun. 20, 2018.

(30) Foreign Application Priority Data

Dec. 13, 2017  (CN) .......................... 201711326541.3

(51) Int. Cl.
  *F16J 15/43*   (2006.01)
  *F16J 15/18*   (2006.01)
(52) U.S. Cl.
  CPC ............... *F16J 15/43* (2013.01); *F16J 15/18* (2013.01)
(58) Field of Classification Search
  CPC .................................. F16J 15/43; F16J 15/18
  See application file for complete search history.

(56) References Cited

U.S. PATENT DOCUMENTS 4,171,818 A * 10/1979 Moskowitz ............ F16J 15/324
                                                       277/410
4,444,398 A *  4/1984 Black, Jr. ................. F16J 15/43
                                                       277/302

(Continued)

FOREIGN PATENT DOCUMENTS

CN      202301967 U     7/2012
CN      205401727 U     7/2016

(Continued)

OTHER PUBLICATIONS

Internation Search Report of PCT/CN2018/091903, dated Aug. 22, 2018.

(Continued)

*Primary Examiner* — Vishal A Patel
(74) *Attorney, Agent, or Firm* — W&K IP

(57) ABSTRACT

An arc-shaped stepped magnetic fluid sealing device comprises a casing, a sealing assembly and an end cover. The sealing assembly comprises a shaft, a permanent magnet, a first pole shoe and a second pole shoe. Inner walls of the first pole shoe and the second pole shoe are both arc-shaped faces inclined towards the side where the permanent magnet is located. A sealed cavity with a larger middle and two smaller ends is enclosed by the inner wall of the first pole shoe, an inner wall of the permanent magnet, and the inner wall of the second pole shoe. A portion of the shaft that is located inside the sealed cavity matches the sealed cavity in shape. Inner walls of the first pole shoe and the second pole shoe are respectively provided with first pole teeth and second pole teeth.

10 Claims, 1 Drawing Sheet

(56) References Cited

U.S. PATENT DOCUMENTS

| | | | | |
|---|---|---|---|---|
| 4,455,026 A | * | 6/1984 | Pinkus | F16J 15/43 277/301 |
| 5,118,118 A | * | 6/1992 | Tadic | F16J 15/43 277/351 |
| 6,671,125 B1 | * | 12/2003 | Sumi | F16J 15/43 310/67 R |
| 6,679,501 B1 | * | 1/2004 | Pelstring | F16C 33/102 277/301 |
| 6,769,694 B2 | | 8/2004 | Anzai et al. | |
| 6,976,682 B1 | * | 12/2005 | Macleod | F16J 15/43 277/410 |
| 2002/0063229 A1 | | 5/2002 | Chang et al. | |
| 2010/0090413 A1 | | 4/2010 | Helgeland et al. | |

FOREIGN PATENT DOCUMENTS

| | | |
|---|---|---|
| CN | 106151527 A | 11/2016 |
| CN | 107842613 A | 3/2018 |
| EP | 3124835 A1 | 2/2017 |

OTHER PUBLICATIONS

Notification to Grant Patent Right of CN201711326541,3 (Foreign Priority Application of Current Application) From State IP Office of China, dated Mar. 7, 2019.

* cited by examiner

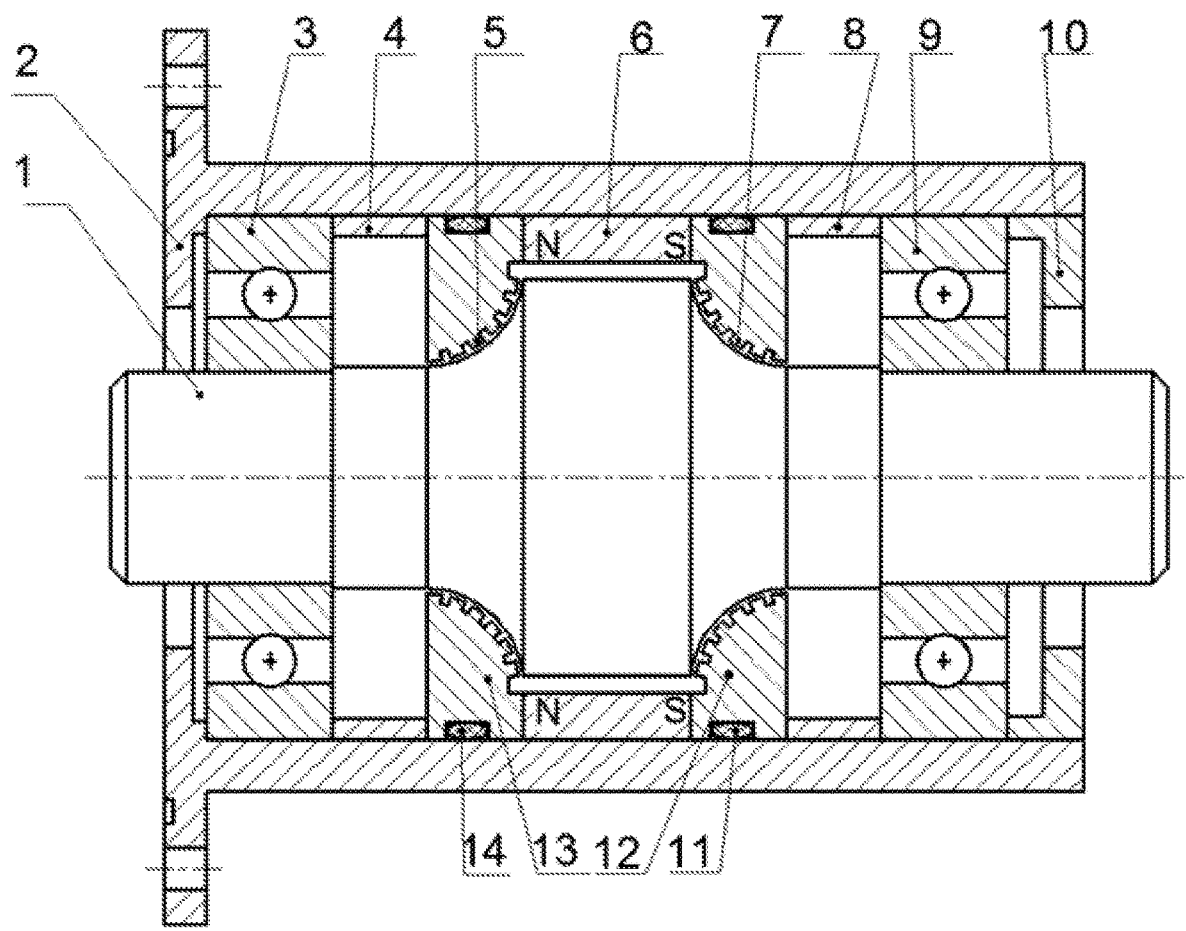

ARC-SHAPED STEPPED MAGNETIC FLUID SEALING DEVICE

CROSS-REFERENCE TO RELATED APPLICATIONS

This application is a continuation of International Patent Application No. PCT/CN2018/091903 with a filing date of Jun. 20, 2018, designating the United States, now pending, and further claims priority to Chinese Patent Application No. 201711326541.3 with a filing date of Dec. 13, 2017. The content of the aforementioned applications, including any intervening amendments thereto, are incorporated herein by reference.

TECHNICAL FIELD

The disclosure relates to an arc-shaped stepped magnetic fluid sealing device.

BACKGROUND OF THE PRESENT INVENTION

Magnetic fluid seals have the advantages of zero leakage and no rigid friction, and are widely used in all walks of life. However, the pressure capability value of the magnetic fluid shaft seal is very sensitive to the size of the sealing gap. The pressure capability value of the magnetic fluid shaft seal can be reduced by more than 10% if the size of the sealing gap is increased by 0.1 mm. When the magnetic fluid sealing technology is applied in a large-diameter, high-speed and heavy-load sealing environment, the magnetic fluid in the sealing gap is often ineffective because the sealing gap is too large. Therefore, improving the pressure resistance of the magnetic fluid seal for large gap is one of the hot issues in current research.

In the magnetic fluid seal, the magnetic fluid is firmly fixed in the sealing gap by the magnetic field force in the sealing gap produced by the permanent magnets, to resist the pressure difference on both sides, so as to achieve the sealing effect. One of the methods to improve the pressure resistance capacity of the magnetic fluid seal for the large gap is improving the structure of the magnetic fluid seal. The existing magnetic fluid sealing device has a stepped shaft sealing structure, which greatly improves the sealing ability of the conventional non-stepped shaft sealing structure. However, in order to further improve the pressure resistance and effectively improve the leak-proof sealing ability of the device, the structural design needs to be further optimized.

Compared with other ordinary magnetic fluid seals, the sealing performance of the existing sealing device has been greatly improved and the stress concentration of the bearing has been reduced, but it still cannot meet the requirements of higher sealing performance in high-speed and heavy-load occasions.

SUMMARY OF PRESENT INVENTION

The purpose of the present disclosure is to provide an arc-shaped stepped magnetic fluid sealing device, so as to solve the problem of low pressure resistance of existing sealing devices, so that the sealing technology can be successfully applied in high-speed and heavy-load occasions.

In order to solve the above technical problems, an arc-shaped stepped magnetic fluid sealing device is provided in the present disclosure. The sealing device includes a casing with openings at two ends, a sealing assembly, and an end cover for firmly pressing the sealing assembly against the casing. The sealing assembly comprises a shaft rotatably installed in the casing through a bearing, a permanent magnet provided between the shaft and the casing, and a first pole shoe and a second pole shoe provided on an inner wall of the casing and on two sides of the permanent magnet. An inner wall of the first pole shoe and an inner wall of the second pole shoe are both arc-shaped faces inclined towards the side where the permanent magnet is located. A sealed cavity with a larger middle and two smaller ends is enclosed by the inner wall of the first pole shoe, an inner wall of the permanent magnet, and the inner wall of the second pole shoe. A portion of the shaft that is located inside the sealed cavity matches the sealed cavity in shape. Gaps are respectively provided between an outer wall of the shaft and the inner wall of the first pole shoe, the inner wall of the permanent magnet, and the inner wall of the second pole shoe. The inner wall of the first pole shoe and/or the corresponding outer wall of the shaft is provided with first arc-shaped pole teeth, and the inner wall of the second pole shoe and/or the corresponding outer wall of the shaft is provided with second arc-shaped pole teeth.

Further, in order to obtain an arc-shaped stepped magnetic fluid sealing structure, the arc surface is a circular arc surface. Correspondingly, at this time, the first arc-shaped pole teeth and the second arc-shaped pole teeth are both circular arc-shaped pole teeth.

Further, the curvature radius of the circular arc surface is 5-60 mm, and preferably 10-50 mm.

Further, the amount of the first arc-shaped pole teeth is 1-15, and preferably 5-10. The amount of the second arc-shaped pole teeth is 1-15, and preferably 5-10.

Further, the size of the sealing gap between the inner wall of the first pole shoe and the corresponding outer wall of the shaft is 0.05-3 mm, and preferably 1-2 mm.

There may be multiple permanent magnets, and each permanent magnet has the above structure.

Further, the amount of the permanent magnets is 2-10.

Further, the amount of the first pole shoes is 2-10, and the amount of the second pole shoes is 2-10.

Further, the inner wall of the first pole shoe and the inner wall of the second pole shoe are symmetrical along a plane of a central axis perpendicular to the shaft.

Further, an annular first groove is provided on the outer wall of the first pole shoe, and a first sealing ring is provided in the first groove. An annular second groove is provided on the outer wall of the second pole shoe, and a second sealing ring is provided in the second groove.

Further, a first magnetic isolation ring and a second magnetic isolation ring are respectively provided on the inner wall of casing and close to the first pole shoe and the second pole shoe.

Further, there are two bearings, including a first bearing and a second bearing respectively, and they are respectively arranged outside the first pole shoe and the second pole shoe.

Further, the end cover is detachably fixed to the right end of the casing through threads.

In the present disclosure, an arc-shaped stepped shaft and an arc-shaped pole shoe are provided, and the pole teeth on the arc-shaped pole shoes are designed as an arc structure, magnetic fluid can be injected into the arc-shaped sealing gap formed between the arc-shaped pole teeth and the arc-shaped stepped shaft, thereby realizing an arc-shaped stepped magnetic fluid seal.

The present disclosure can overcome the problem that the existing magnetic fluid sealing device cannot achieve the high sealing performance requirements in special working conditions such as high-speed and heavy-load occasions. And the sealing device in the present disclosure has a simple structure and is convenient to be disassembled and assembled. Particularly, the structure design of the pole shoe with arc-shaped pole teeth can greatly increase the magnetic flux in the magnetic circuit, which can greatly reduce the loss of the magnetic fluid when the seal is ineffective, and improve the primary and secondary pressure resistance capacity and sealing reliability of the magnetic fluid seal under large-gap conditions, thus expanding its safe working range and being able to meet the requirements of working conditions such as large gap, high speed, and heavy load.

DESCRIPTION OF THE DRAWINGS

FIG. 1 is a schematic cross-sectional structural view of a magnetic fluid sealing device according to the first embodiment of the present disclosure.

DETAILED DESCRIPTION OF PREFERRED EMBODIMENTS

The present disclosure will be described in detail below with reference to the drawings and in conjunction with the embodiments. It should be noted that the embodiments of the present disclosure and the features in the embodiments can be combined with each other if not conflicting. For the convenience of description, the words such as "up", "down", "left", and "right" appeared in the following description only indicate that they are consistent with the up, down, left, and right directions of the drawings, and not limitation to the structure.

Referring to FIG. 1, an arc-shaped stepped magnetic fluid sealing device is provided, which includes a casing 2 with openings at two ends, a sealing assembly, and an end cover 10 for firmly pressing the sealing assembly against the casing 2. The sealing assembly comprises a shaft 1 which is rotatably installed in the casing 2 through a bearing, a permanent magnet 6 which is provided between the shaft 1 and the casing 2, and a first pole shoe 13 and a second pole shoe 12 which are respectively provided on an inner wall of the casing and on two sides of the permanent magnet 6. An inner wall of the first pole shoe 13 and an inner wall of the second pole shoe 12 are both arc-shaped faces inclined towards the side where the permanent magnet 6 is located. A sealed cavity with a larger middle and two smaller ends is enclosed by the inner wall of the first pole shoe 13, an inner wall of the permanent magnet 6 and the inner wall of the second pole shoe 12. A portion of the shaft 1 that is located inside the sealed cavity matches the sealed cavity in shape. Gaps are respectively provided between an outer wall of the shaft 1 and the inner wall the first pole shoe 13, the inner wall of the permanent magnet 6 and the inner wall of the second pole shoe 12. The inner wall of the first pole shoe 13 is provided with first pole teeth 5, and the inner wall of the second pole shoe 12 is provided with second pole teeth 7.

Wherein, the arc surface is a circular arc surface with a curvature radius of 20 mm. There are six first pole teeth 5 and six second pole teeth 7. The size of the sealing gap between the inner wall of the first pole shoe 13 and the corresponding outer wall of the shaft 1 is 0.1 mm.

The inner wall of the first pole shoe 13 and the inner wall of the second pole shoe 12 are symmetrical along a plane of a central axis perpendicular to the shaft. An annular first groove is provided on the outer wall of the first pole shoe 13, and a first sealing ring 14 is provided in the first groove. An annular second groove is provided on the outer wall of the second pole shoe 12, and a second sealing ring 11 is provided in the second groove. A first magnetic isolation ring 4 and a second magnetic isolation ring 8 are respectively provided on the inner wall of casing and close to the first pole shoe 13 and the second pole shoe 12.

There are two bearings, comprising a first bearing 3 and a second bearing 9, and they are respectively arranged outside the first magnetic isolation ring 4 and the second magnetic isolation ring 8. The end cover 10 is detachably fixed to the right end of the casing 2 through threads.

In assembly, the main process includes the following steps.

First, the first sealing ring 14 is installed in the first groove on the outer circumferential wall of the first pole shoe 13.

Second, the second sealing ring 11 is installed in the second groove on the outer circumferential wall of the second pole shoe 12.

Third, the permanent magnet 6 and the first pole shoe 13 with the first sealing ring 14 are installed on the shaft 1 from the left side of the shaft.

Forth, the magnetic fluid is injected into the sealing gap formed between the first pole shoe 13 and the shaft 1.

Fifth, the second pole shoe 12 with the second sealing ring 11 is installed on the shaft 1 from the right side of the shaft.

Sixth, the magnetic fluid is injected into the sealing gap formed between the second pole shoe 12 and the shaft 1.

Seventh, the first magnetic isolation ring 4 and the first bearing 3 are installed on the shaft 1 from the left side of the shaft.

Eighth, the second magnetic isolation ring 8 and the second bearing 9 are installed on the shaft 1 from the right side of the shaft to form the sealing assembly.

Ninth, the sealing assembly is installed in the casing 2 and the outer ring of the second bearing 9 is firmly pressed through the threaded connection of the end cover 10 and the casing 2, thus realizing the arc-shaped stepped magnetic fluid seal.

It should be understood that, the contents explained in the above embodiments are only used to clearly illustrate the present disclosure, but not to limit the scope of the present disclosure. Any equivalent modifications made by those skilled in the art in the teach of the present disclosure should fall in the scope defined by the claims appended to this application.

We claim:

1. An arc-shaped stepped magnetic fluid sealing device, including a casing (2) with openings at two ends, a sealing assembly and an end cover (10) for firmly pressing the sealing assembly against the casing (2), the sealing assembly comprises a shaft (1) rotatablely installed in the casing (2) through a bearing, a permanent magnet (6) which is provided between the shaft (1) and the casing (2), a first pole shoe (13) and a second pole shoe (12) which are provided on an inner wall of the casing and on two sides of the permanent magnet (6), an inner wall of the first pole shoe (13) and an inner wall of the second pole shoe (12) are both arc-shaped faces inclined towards the side where the permanent magnet (6) is located, a sealed cavity with a larger middle and two smaller ends is enclosed by the inner wall of the first pole shoe (13), an inner wall of the permanent magnet (6), and the inner wall of the second pole shoe (12), a portion of the shaft (1) that is located inside the sealed cavity matches the sealed cavity in shape, gaps are provided respectively between an outer wall of the shaft (1) and the inner wall of the first pole shoe (13), the inner wall of the permanent magnet (6), and the inner wall of the second pole shoe (12), the inner wall of the first pole shoe (13) and/or the corresponding outer wall of the shaft (1) is provided with first arc-shaped pole teeth (5), and the inner wall of the second pole shoe (12) and/or the corresponding outer wall of the shaft (1) is provided with second arc-shaped pole teeth (7).

2. The magnetic fluid sealing device according to claim 1, wherein the arc-shaped faces are circular arc surfaces.

3. The magnetic fluid sealing device according to claim 2, wherein the curvature radius of the circular arc surfaces are 5-60 mm.

4. The magnetic fluid sealing device according to claim 1, wherein the amount of the first arc-shaped pole teeth (5) is 1-15, and the amount of the second arc-shaped pole teeth (7) is 1-15.

5. The magnetic fluid sealing device according to claim 1, wherein the gap between the inner wall of the first pole shoe (13) and the corresponding outer wall of the shaft (1) is 0.05-3 mm.

6. The magnetic fluid sealing device according to claim 1, wherein the inner wall of the first pole shoe (13) and the inner wall of the second pole shoe (12) are symmetrical along a plane of a central axis perpendicular to the shaft.

7. The magnetic fluid sealing device according to claim 1, wherein an annular first groove is provided on the outer wall of the first pole shoe (13), and a first sealing ring (14) is provided in the first groove, an annular second groove is provided on the outer wall of the second pole shoe (12), and a second sealing ring (11) is provided in the second groove.

8. The magnetic fluid sealing device according to claim 1, wherein a first magnetic isolation ring (4) and a second magnetic isolation ring (8) are respectively provided on the inner wall of the casings and close to the first pole shoe (13) and the second pole shoe (12).

9. The magnetic fluid sealing device according to claim 1, wherein the bearing is a first bearing (3) and a second bearing (9), and they are respectively arranged outside the first pole shoe (13) and the second pole shoe (12).

10. The magnetic fluid sealing device according to claim 1, wherein the end cover (10) is detachably fixed to the right end of the casing (2) through threads.

\* \* \* \* \*